(12) United States Patent
Polish

(10) Patent No.: US 6,430,531 B1
(45) Date of Patent: Aug. 6, 2002

(54) BILATERAL SPEECH SYSTEM

(75) Inventor: Nathaniel Polish, New York, NY (US)

(73) Assignee: Soliloquy, Inc., New York, NY (US)

( * ) Notice: Subject to any disclaimer, the term of this patent is extended or adjusted under 35 U.S.C. 154(b) by 0 days.

(21) Appl. No.: 09/495,722

(22) Filed: Feb. 1, 2000

Related U.S. Application Data
(60) Provisional application No. 60/118,800, filed on Feb. 4, 1999.

(51) Int. Cl.[7] .............................................. G10L 15/18
(52) U.S. Cl. ...................................... 704/257; 704/275
(58) Field of Search ................................. 704/275, 270, 704/270.1, 257, 254, 255, 249, 200

(56) References Cited

U.S. PATENT DOCUMENTS

| | | | |
|---|---|---|---|
| 4,445,187 A | 4/1984 | Best ............................ 364/521 |
| 5,197,005 A | 3/1993 | Shwartz et al. .............. 364/419 |
| 5,265,065 A | 11/1993 | Turtle .......................... 395/600 |
| 5,369,575 A | 11/1994 | Lamberti et al. ....... 364/419.08 |
| 5,418,948 A | 5/1995 | Turtle .......................... 395/600 |
| 5,442,780 A | 8/1995 | Takanashi et al. .......... 395/600 |
| 5,454,106 A | 9/1995 | Burns et al. ................. 395/600 |
| 5,471,611 A | 11/1995 | McGregor ................... 395/600 |
| 5,555,169 A | 9/1996 | Namba et al. .......... 364/419.08 |
| 5,555,408 A | 9/1996 | Fujisawa et al. ............. 395/600 |
| 5,583,982 A | 12/1996 | Matheny et al. ............. 395/326 |
| 5,584,024 A | 12/1996 | Shwartz ....................... 395/604 |
| 5,732,216 A * | 3/1998 | Logan et al. ............. 395/200.3 |
| 5,754,736 A | 5/1998 | Aust .......................... 395/2.61 |
| 5,761,631 A | 6/1998 | Nasukawa ....................... 704/9 |
| 5,794,050 A | 8/1998 | Dahlgren et al. ............ 395/708 |
| 5,819,243 A | 10/1998 | Rich et al. ..................... 706/11 |
| 5,855,002 A | 12/1998 | Armstrong ................... 704/270 |
| 5,875,333 A | 2/1999 | Fish et al. .................... 395/702 |
| 5,895,464 A | 4/1999 | Bhandari et al. ............... 707/3 |
| 5,924,089 A | 7/1999 | Mocek et al. ................... 707/4 |
| 5,960,399 A * | 9/1999 | Barclay et al. .............. 704/270 |
| 5,963,940 A | 10/1999 | Liddy et al. .................... 707/5 |
| 5,983,221 A * | 11/1999 | Christy ........................... 707/5 |

OTHER PUBLICATIONS

ACM Multimedia. Hemphill et al., "Speech–Aware Multimedia". 1996. pp. 74–78.*

* cited by examiner

Primary Examiner—Richemond Dorvil
(74) Attorney, Agent, or Firm—Pennie & Edmonds LLP

(57) ABSTRACT

A speech processor that both speaks and listens uses speech recognizers as well as speech synthesizers to allow a user to engage in a verbal dialog with a data base. An element of working memory holds whatever is the context of the dialog so that the system can respond to successive requests or statements with greater and greater specificity.

12 Claims, 5 Drawing Sheets

BILATERAL SPEECH SYSTEM

This application claims priority from provisional patent application Ser. No. 60/118,800 filed Feb. 4, 1999 which is hereby incorporated by reference in its entirety. It is believed that no new matter has been. added to this application beyond that disclosed in that provisional patent application.

FIELD OF THE INVENTION

This invention relates to the fields of speech processing and database retrieval.

BACKGROUND OF THE INVENTION

Previously speech systems were generally unidirectional. Speech recognizers would take input for commands or dictation and produce results otherwise accomplished by buttons or keyboards. Speech synthesizers would simply read text to people and achieve effects otherwise available from screens or printouts.

SUMMARY OF EMBODIMENTS OF THE INVENTION

A speech processor that both speaks and listens uses speech recognizers as well as speech synthesizers to allow a user to engage in what is commonly thought of as a dialog with a data base. According to an embodiment of the invention, an element of working memory holds whatever is the context of the dialog so that the system can respond to successive statements with greater and greater specificity.

In particular, the present invention provides a method of generating content information for output to a user. The method includes the steps of generating first information based on a first statement in a natural language, and generating second information based on a second statement in the natural language and based on a context provided by the first information. The method also includes the step of incorporating content information generated based on the second information into output to the user.

The method can also include the steps of generating a first query based at least in part on the first statement, and querying a database using the first query to thereby generate the first information. Further, the method can include the step of generating at least a first answer in the natural language based on the first information, and generating at least a second query based on the second statement and further based on the context provided by the first statement, the first information, and the first answer.

Moreover, the method can also include the step of querying the database using the second query to thereby generate the second information and generating at least a second answer in the natural language based on the second information. The first and second queries may be in Structured Query Language.

In another aspect of the invention, the second statement is a specific statement relating to the first statement. In addition, the context provided by the first information may comprise a specific phrase included in the first statement.

If desired, the method may also include the steps of generating third information based on a third statement in the natural language and based on a context provided by at least one of the first and second information, and incorporating content information generated based on the third information into the output to the user.

The present invention also provides a method of querying a database. The method includes the steps of receiving a first statement in a natural language, generating grammatical data, and generating at least a first query based on the first statement and the grammatical data. The method also includes the steps of generating first information based on the first query, generating a first answer in a natural language based on the first information, and receiving a second statement in the natural language. The method further includes the step of generating a second query based on the second statement and a context provided by at least one of the first query, the first information, and the first answer.

The method may also comprise the step of generating content for output to the user that includes the first answer. Further, the method may include the steps of generating second information based on the second query, and generating at least a second answer in the natural language based on the second information. It should also be noted that the step of generating the first query can include the step of fuzzy matching the first statement to the grammar.

The present invention further provides a speech recognition system. The system includes an input device configured to receive a first statement in a natural language and a system state controller configured to provide grammatical data to the input device. The input device is further configured to generate a first query based on the first statement and the grammatical data, and a database configured to generate first information based on the first query. The system also includes an output device configured to generate a first answer in the natural language based on the first information. The input device is further configured to receive a second statement in the natural language and configured to generate a second query based on the second statement and a context provided by at least one of the first query, the first information, and the first answer.

The system may also include a memory bank configured to store the first query, the first information and the first answer. The memory can be further configured to store at least one of an antecedent to a pronoun and a disambiguating homonym for the first statement. The system can also comprise a speech recognizer configured to receive the first statement and configured to convert the first statement into a plurality of phonemes and a first language model configured to generate a plurality of parsing tokens based on the plurality of phonemes and the grammatical data. In addition, the system can also include a query generator configured to generate the first query based on the plurality of parsing tokens.

The database can be further configured to generate second information based on the second query, and the output device can also be further configured to generate a second answer in the natural language based on the second information.

The system may also comprise a device controller configured to carry out a command from the system state controller. The system state controller can be further configured to generate the command based on at least one of the first information, the second information, the first answer and the second answer. The device controller may also be further configured to generate content for output to the user that includes at least one of the first answer and the second answer. The system can also include a synthesizer configured to convert the second answer to a voice message.

DESCRIPTION OF PREFERRED EMBODIMENTS

Figure 1:
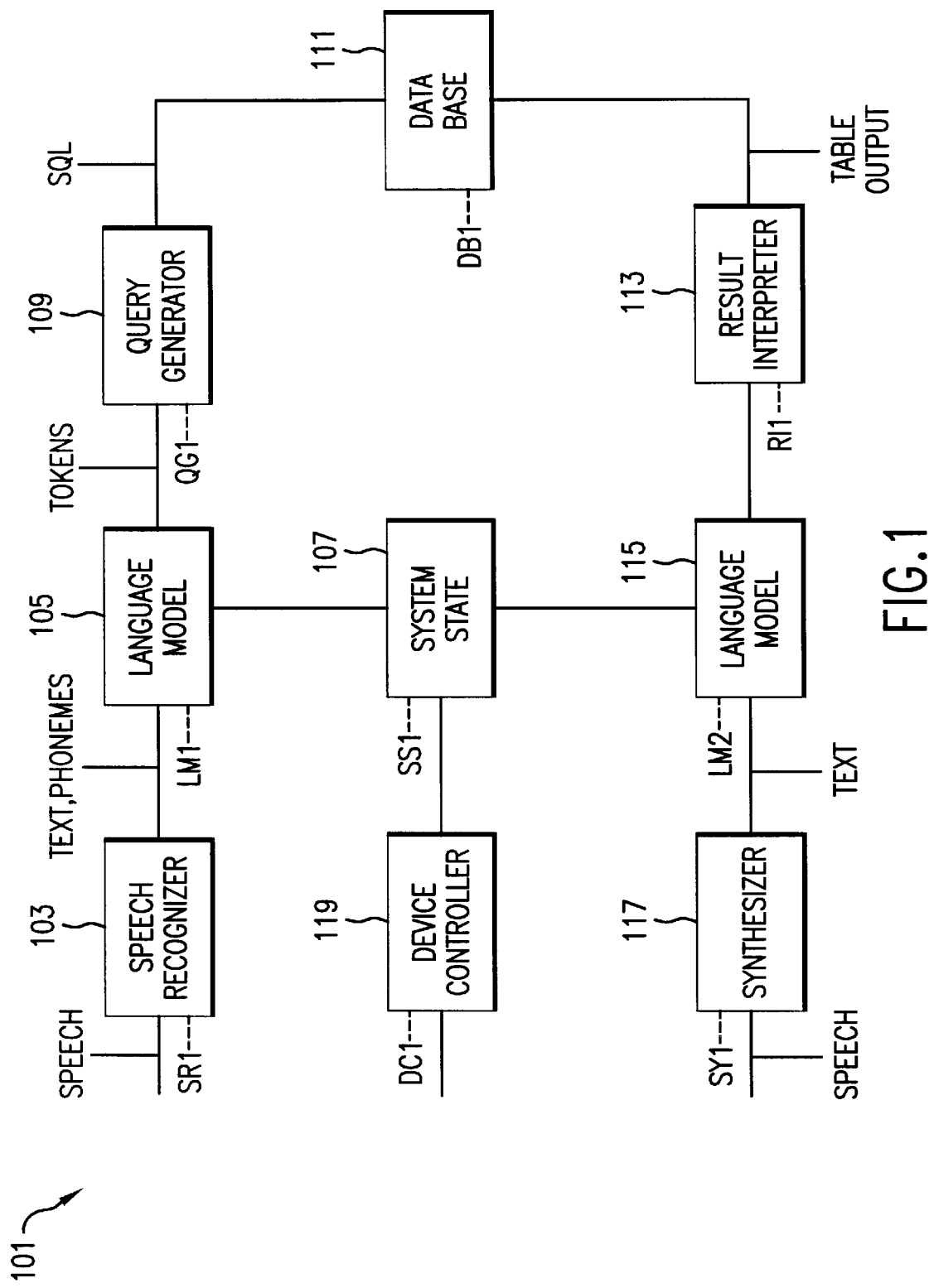
FIG. 1 is a block diagram of an embodiment of the invention.

FIG. 1 illustrates a system ST1 101 that serves a user who, for example, may wish to query a guide such as a television program guide to determine when one or more reruns of a particular television program, e.g. a Seinfeld rerun, is available. For this purpose the user speaks a phrase or sentence such as "Where and when is Seinfeld being broadcast this week?" into a microphone MI1. The analog speech signal enters a speech recognizer SR1 103 which converts the speech into phonemes in the form of digital text.

A language model LM1 105 that includes a parser then receives the digital text from the speech recognizer SR1 103 and exchanges grammatical and other data with a system state SS1 107. With the data from the system state SS1 107, the language model LM1 105 produces parsing tokens which it sends to a data base query generator QG1 109 that questions a data base DB1 111. The latter seeks the desired information and passes raw information to a result interpreter RI1 113 that interprets the results. A second language model LM2 115 receives the interpreted results from the result interpreter RI1 113 and exchanges information with the system state SS1 107 to produce a digital text response. A synthesizer SY1 117 converts the response text to analog speech perceptible by the person posing the original question and sends it to a speaker SP1.

The system state SS1 107 includes a memory bank that retains the data from the language models LM1 105 and LM2 115 concerning the context of the statements of both the user and the data base DB1 111. According to an embodiment the memory bank is distributed partially in the system state SS1 107 and one or both of the language models LM1 105 and LM2 115. With the first question the system state SS1 107 retains data from the language model LM1 105 concerning that question.

The reply to the initial question concerning the Seinfeld episodes may be "There are five Seinfeld episodes this week, the first on Sunday at 8:00 PM on channel 110, the second on Wednesday . . . " The system state SS1 107 then retains data concerning the answer.

The user may then ask follow-up questions, such as "Give me a summary of the third and fourth." Because the system state SS1 107 has memorized the context of the user's first question or statement as well as the context to the first answer, the system ST1 101 is ready for a more specific statement without the user repeating the facts in the initial question.

In response to the second question, the system ST1 101 may then pass the inquiry through the speech recognizer SR1 103, the language model LM1 105, the system state SS1 107, the query generator QG1 109, the data base DB1 111, the result interpreter RI1 113, the language model LM2 115, and the synthesizer SY1 117. The system state SS1 107 gives the second question a context from which it can be understood as referring to the initial inquiry concerning the Seinfeld rerun availability. The output at the speaker would then include the summaries.

The user could thereupon ask the system ST1 101 "Record the third episode." For responding to the last demand by the user, the system ST1 101 again routes the input to speech recognizer SR1 103, the language model LM1 105, the system state SS1 107, the query generator QG1 109, the data base DB1 111, the result interpreter RI1 113, the language model LM2 115, and the synthesizer SY1 117. Again, it is the memory in the system state SS1 107 that recollects the prior information and can react to the more specific order without requiring repeat of the earlier information.

The system state SS1 107 operates a device controller DC1 119 that takes the data base results and controls a device, such as a video cassette recorder (VCR) or a web browser and makes the latter respond to the action requested by the user. For example, the device controller DC1 119 then sets the VCR to the time and channel of the episode or episodes to be recorded. At the same time, the synthesizer SY1 117 causes the speaker SP1 to inform the user "Episode 3 set for recording at 11 P.M. Thursday."

The device controller DC1 119 may govern any number of devices. For example, if the user wishes to have the system ST1 101 browse the web, the device controller DC1 119 can have a browser seek any kind of intelligence and return graphic, text, and/or voice reports.

Figure 2:
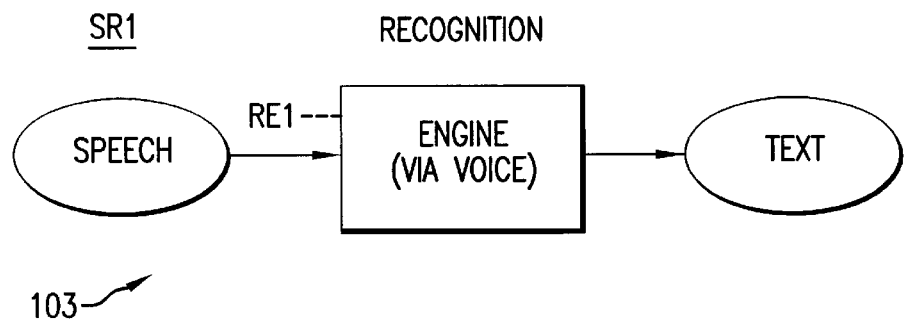
FIG. 2 is a diagram illustrating speech recognition in the diagram of FIG. 1.

The speech recognizer SR1 103 may be any type of standard speech recognition engine using programs such as IBM Via Voice and Dragon Dictate both of which are registered trademarks and run on standard PC platforms. FIG. 2 illustrates a sample of the speech recognizer SR1 in FIG. 1 using a speech recognizing engine.

Figure 3:
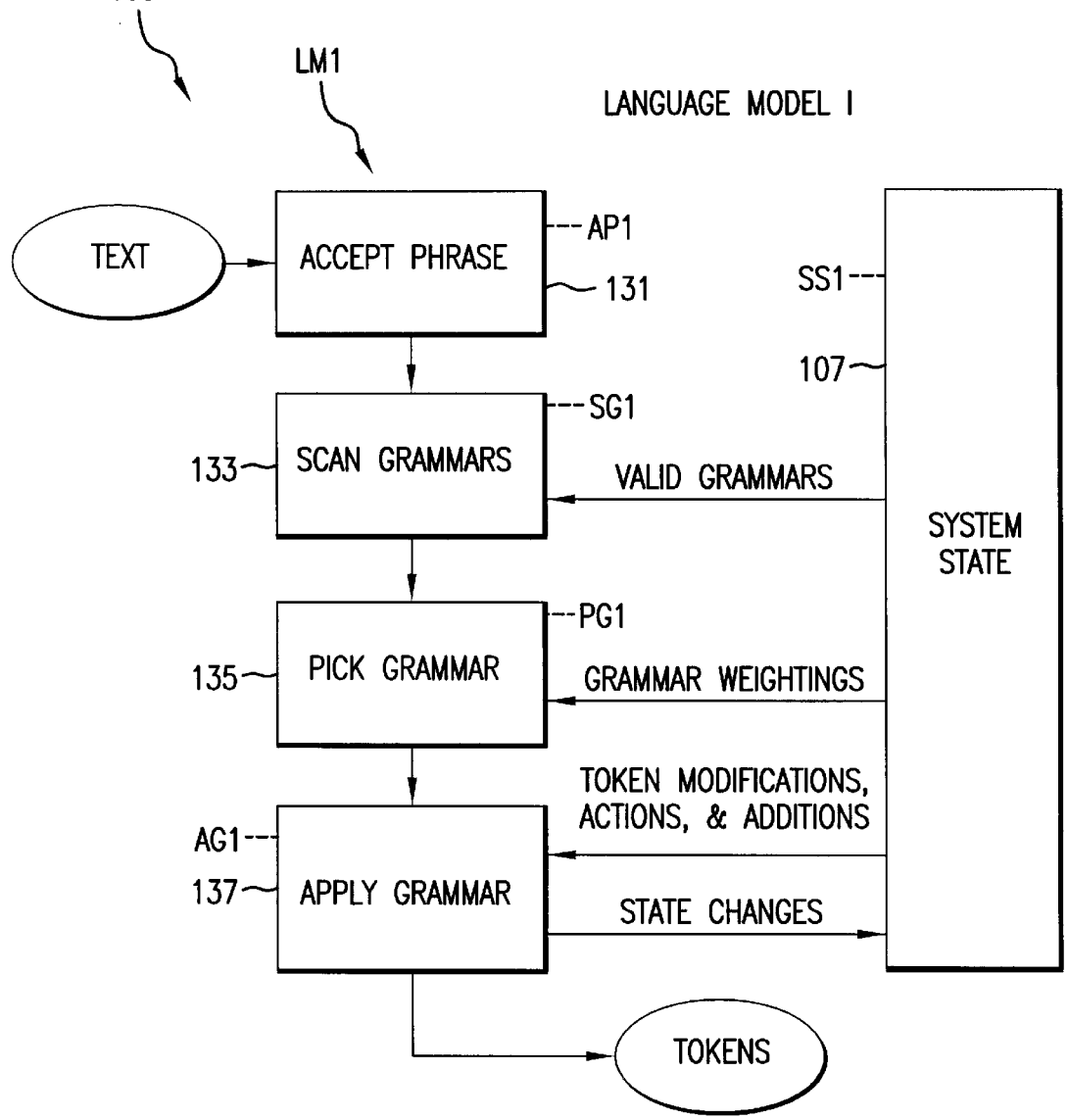
FIG. 3 is a diagram operation of a language model of the diagram of FIG. 1.

FIG. 3 illustrates the operation of the language model LM1 105. The process routes the text from the speech recognition system to the language model LM1 105 where a complete "phrase" is assembled in the "Accept Phrase" section AP1 131. Timing cues provide information as to the end of a phrase.

In a "pick grammars" section PG1 135, the language model LM1 105 chooses a limited set of grammar candidates to explore in the system state SS1 107 based on their weightings. Each of the selected grammars are applied in the "apply grammar?" section AG1 131. The results of each grammar are evaluated and a single one is chosen based on several possible criteria. The state changes from the final grammar are sent to the system state SS1 107. The tokens generated by the final grammar are then sent to the query generator QG1 109.

Figure 4:
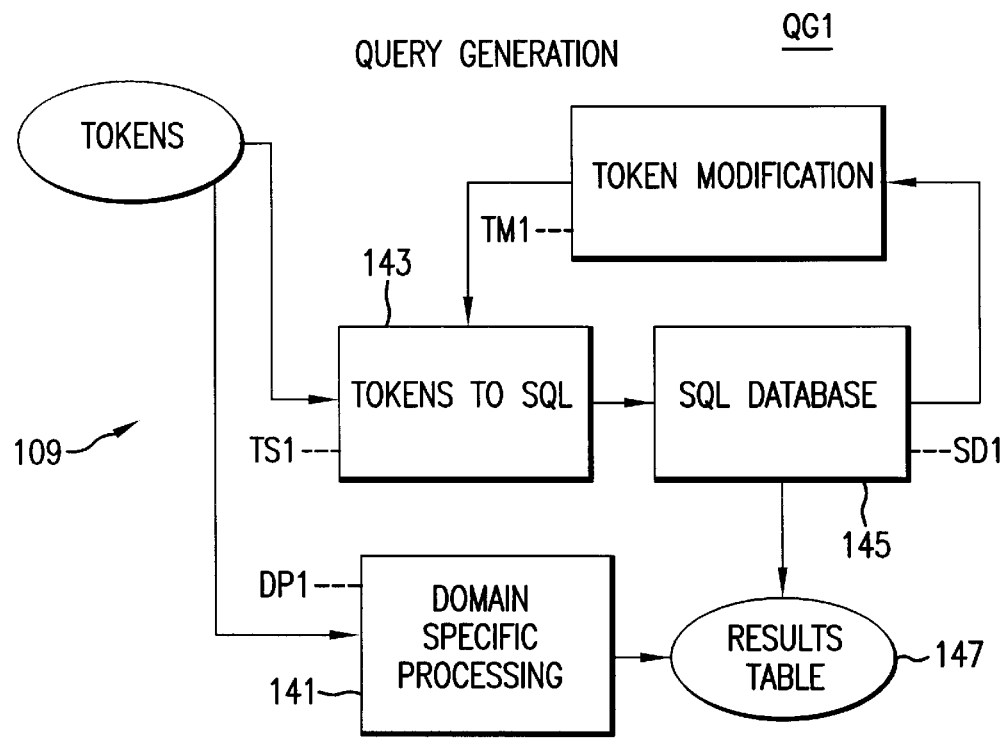
FIG. 4 is a diagram illustrating query generation in the diagram of FIG. 1.

Query generation appears in FIG. 4 The query generator QG1 109 is responsible for retrieving information from the domain specific knowledge base. Specialized domain processing based on the grammar and the instantiated tokens takes place in the domain specific processing section DP1 141. Processing includes, but is not limited to, the generation of a SQL query from tokens in a tokens to SQL section TS1 143 against a database system SQL database SD1 145. Examples of database systems are Sybase and Oracle.

Figure 5:
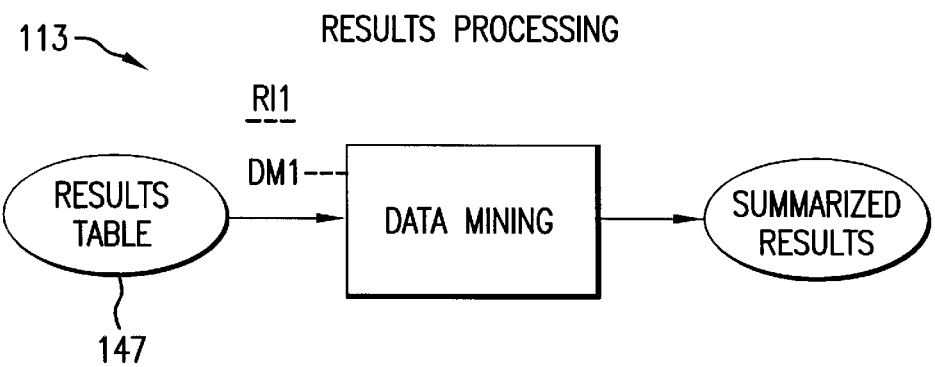
FIG. 5 is a diagram illustrating results processing in the diagram of FIG. 1.

If an appropriate answer for the grammar is not found, a fuzzy matching process may take place to refine the answer. For example, searching phonetically. The end result is a result table RT1 147 containing the information requested. The table RT1 147 is sent to the result interpreter RI1 113 for additional data mining to produce summarized results. This appears in FIG. 5. Information summary and consolidation features take place.

Figure 6:
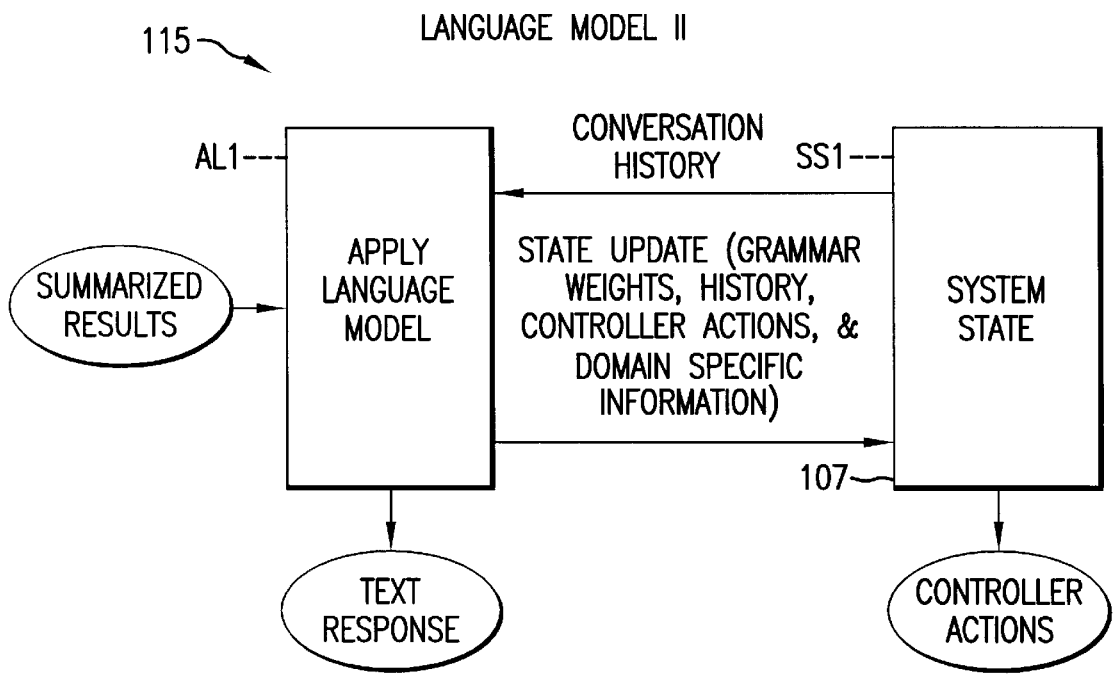
FIG. 6 is a diagram illustrating another language model in the diagram of FIG. 1.

The summarized results arrive at the language model LM2 115 as shown in FIG. 6. Here the current grammar and conversation history are used to interpret the returned data and generate a formatted response. The system state SS1 107 is updated to reflect the new conversation history and updates the grammar weightings for the "pick grammars" phase of language model LM1 105. Updates to the system state SS1 107 signal actions for the controlled unit to execute. For example, the navigation of a web browser or the operation of a VCR.

Figure 7:
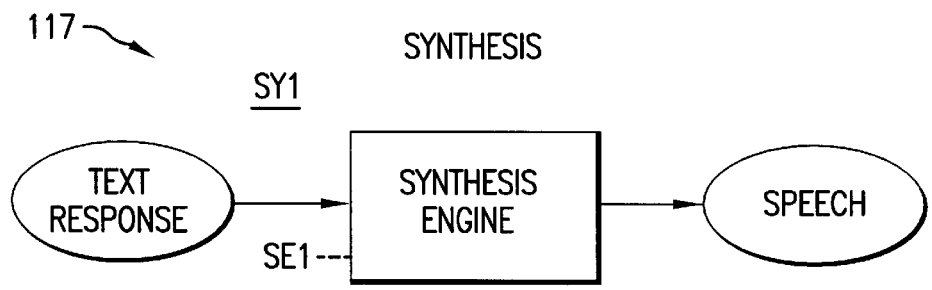
FIG. 7 is a diagram illustrating synthesis in the diagram of FIG. 1.

The text portion of the response is then sent to a standard speech synthesis engine (shown in FIG. 7) forming the synthesizer SY1 117. Here it is converted to speech and played back to the user.

The user then speaks again and the process repeats itself, going from the general to the specific and using the system state SS1 107 to remember the more general questions so as to produce the more specific answers.

In this process speech comes in for conversion to text, a query gets generated, output comes out, and then another query comes in. This results in looping from general to specific.

In another example the user says "I'm looking for song with particular lyrics A." The system ST1 101 finds the song and informs the user of its name with speech. The user then says "Can I see the lyrics?" and the system ST1 101 finds the lyrics because the system state has memorized the first question and all the data connected therewith.

The system state SS1 107 contains the memory bank that allows the system ST1 101 to respond to the second question. Otherwise, the user would have to say, "Can I see the lyrics for the song . . . ?"

The memory is essential where successive more specific questions arise. If, for example, the user says "I'm looking for a Beatles album, the forty-fourth album by the Beatles. The system ST1 101 then provides the name of the forty fourth album. If the user says "What songs are on a particular album?" and there are 20 songs the system ST1 101 can read all those songs, because of the memory that retains the place in the conversation.

According to another embodiment of the invention, the memory that retains the earlier elements of the conversation appears in whole or in part in the language model LM1 105 and/or LM2 115.

Since all non-trivial dialogs have a context, the system includes an element of working memory that generally is kept filled with whatever is the context of the dialog. This memory can serve for many things including but not limited to assigning antecedents to pronouns, disambiguating homonyms.

The invention furnishes database access, in particular relational database accessed via SQL. According to an embodiment, the system assumes that the user's goal is always to form an SQL query. The language model assisted by the context offered by the working memory forms the basis for the query. For example if the user had asked for "a list of Beatles albums" then that would appear in working memory. Therefore if subsequently the user asks for "albums from 1969" the query will be generated based on Beatles albums from 1969.

Figure 8:
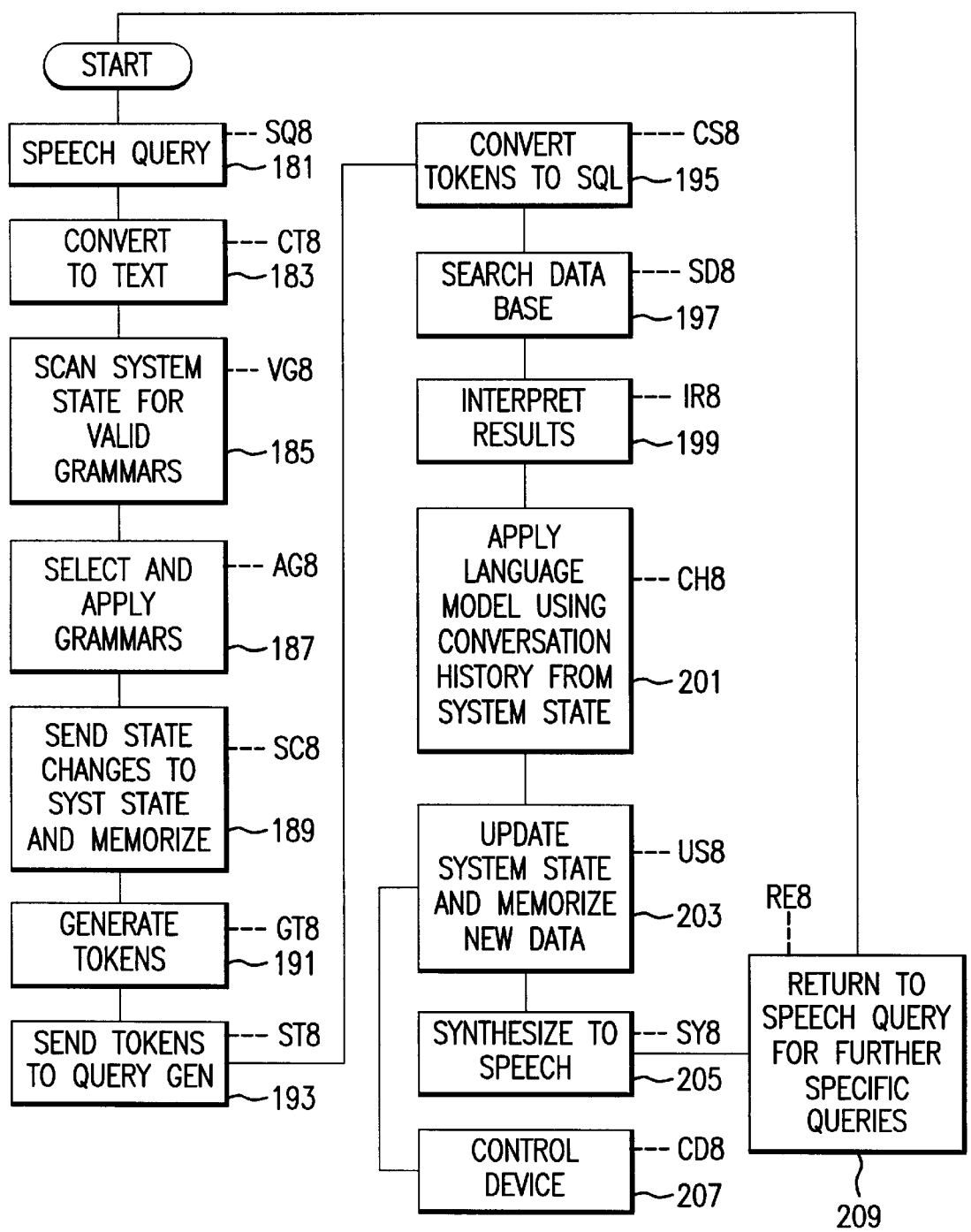
FIG. 8 is a diagram illustrating the operation of the diagram of FIG. 1.

FIG. 8 is an overall flow chart of the operation of the system ST1 101. Here, in step SQ8 181 the user speaks to introduce a query, such as the aforementioned—when one or more reruns of a particular television program, e.g. a Seinfeld rerun, is available, —into a speech receiver such as a microphone that forms part of the speech recognizer SR1 103. In step CT8 183 the speech recognizer SR1 103 (such as a system using the IBM Trademark VIA VOICE) converts the speech into phonemes in the form of digital text. In step VG8 185, the language model LM1 105 that includes a parser then receives the digital text from the speech recognizer SR1 103. The "Accept Phrase" section AP1 131 of the language model LM1 105 assembles a complete "phrase". For example a complete phrase can be determined by a delay greater than a specific amount of time. Still in step VG8 185, in the "pick grammars" section PG1 135 scans a limited set of grammar candidates to explore in the system state SS1 107 based on their weightings.

In step AG8 187, grammars are and applied by the "apply grammar?" section AG1 137. The results of each grammar are evaluated and a single one is chosen based on which is the best fit. In step SC8 189, the grammar is executed and state changes from the final grammar are sent to the system state SS1 101 for memorization. In step GT8 191, the language model LM1 103 generates tokens on the basis of the final grammar. In step ST8 193, the language model sends the tokens to the query generator QG1 109. In step CS8 195, the query generator QG1 109 generates an SQL query from tokens in the tokens-to-SQL section TS1 143. In step SD8 197 the query generator searches the data base DB1 111 to form a result table RT1 147 containing the information requested.

In step IR8 199, the result interpreter RI1 113 receives the table RT1 147 for additional data mining to interpret the results. In step CH8 201 the language model LM2 115 uses the interpreted results and the conversation history from the system state. Specifically, the current grammar and conversation history are used to interpret the returned data and generate a formatted response. In step US8 203 the system state SS1 107 is updated to reflect the new conversation history and updates the grammar weightings for the "pick grammars" phase of language model LM1 105.

If the conversation is complete, in step CD8 207, the system state SS1 signals control of actions, if any, for the controlled unit to execute. In step SY8 205, the synthesizer SY1 117 synthesizes the signals to speech. That is, the text portion of the response is then sent to a standard speech synthesis engine where it is converted to speech and played back to the user. The text to speech synthesizer may be in the form of that available under the trademark Accuvoice.

Step RE8 209 involves return to the speech query step SQ8 181 for further specific queries. Here, the user then speaks again in the step SQ8 181, and text is converted in step CT8 183 and the process repeats itself, going from the general to the specific and using the system state SS1 101 to remember the more general questions so as to produce the more specific answers. In steps SC8 189 and GT8 191 the grammar is executed and tokens generated depending upon the conversation stored in the system state SS1 101. Also, the conversation history and grammar weightings in system state SS1 are updated. This varies depending on the grammar chosen.

The invention furnishes a system for obtaining information verbally from a data base and refining the information continuously without the user repeating information for each refinement while permitting automatic operation of a device on the basis of the verbal conversation. Memory in the system state allows the refinement.

While embodiments of the invention have been described in detail it will be evident to those skilled in the art that the invention may be embodied otherwise without departing from its spirit and scope.

What is claimed is:

1. A speech recognition system comprising:
   an input device configured to receive a first statement in a natural language;
   a system state controller configured to provide grammatical data to the input device, wherein the input device is further configured to generate a first query based on the first statement and the grammatical data;
   a database configured to generate first information based on the first query;
   an output device configured to generate a first answer in the natural language based on the first information; and
   the input device further configured to receive a second statement in the natural language, the second statement comprising a pronoun, and configured to resolve the antecedent for the pronoun based on a context provided at least in part by the first statement.

2. A speech recognition system comprising:
   an input device configured to receive a first statement in a natural language;
   a system state controller configured to provide grammatical data to the input device, wherein the input device is further configured to generate a first query based on the first statement and the grammatical data;
   a database configured to generate first information based on the first query;
   an output device configured to generate a first answer in the natural language based on the first information; and
   the input device further configured to receive a second statement in the natural language, the second statement comprising a homonym, and configured to disambiguate the homonym based on a context provided at least in part by the first statement.

3. The system of claim 1 or 2, wherein the system state controller comprises:
   a memory bank configured to store the first query, the first information and the first answer.

4. The system of claim 3 wherein the input device comprises:
   a speech recognizer configured to receive the first statement and configured to convert the first statement into a plurality of phonemes.

5. The system of claim 4 wherein the input device further comprises:
   a first language model configured to generate a plurality of parsing tokens based on the plurality of phonemes and the grammatical data.

6. The system of claim 5 wherein the input device further comprises:
   a query generator configured to generate the first query based on the plurality of parsing tokens.

7. The system of claim 1 or 2, wherein the first query is in Structured Query Language.

8. The system of claim 1 or 2, wherein the database is further configured to generate second information based on the second query; and
   the output device is further configured to generate a second answer in the natural language based on the second information.

9. The system of claim 8 further comprising:
   a device controller configured to carry out a command from the system state controller, wherein the system state controller is further configured to generate the command based on at least one of the first information, the second information, the first answer and the second answer.

10. The system of claim 9 wherein the device controller is further configured to generate output to a user that includes at least one of the first answer and the second answer.

11. The system of claim 8 wherein the second information is a subset of the first information.

12. The system of claim 8 wherein the output device comprises:
    a synthesizer configured to convert the second answer to a voice message.

* * * * *